June 15, 1943.   P. DAVIE ET AL   2,321,587
ELECTRICAL CONDUCTIVE COATING
Filed May 10, 1940
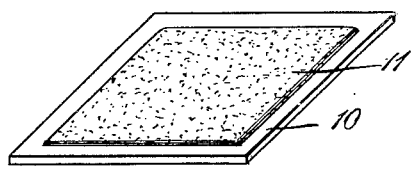
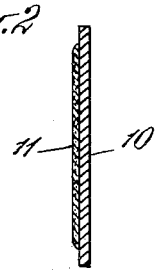
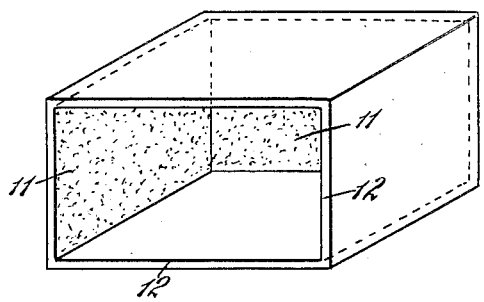
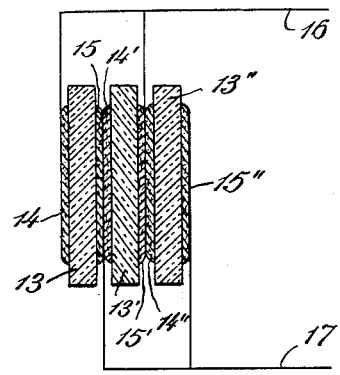
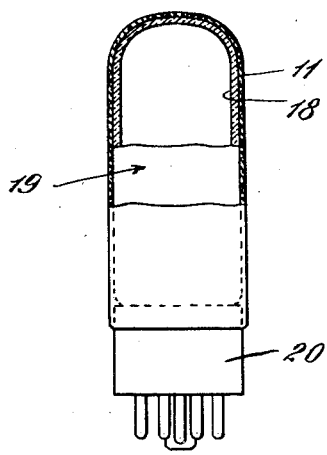
INVENTORS
Preston Davie
Arthur L. Halvorsen
BY
Pennie, Davis, Marvin & Edmonds
ATTORNEYS Patented June 15, 1943

2,321,587

UNITED STATES PATENT OFFICE 2,321,587

ELECTRICAL CONDUCTIVE COATING

Preston Davie, New York, and Arthur L. Halvorsen, Purdy, N. Y.; said Halvorsen assignor to said Davie Application May 10, 1940, Serial No. 334,462

1 Claim. (Cl. 117—93)

This invention relates to electrically conductive coatings, especially to coatings formed by applying a coating composition to desired object surfaces. The invention in its broad aspects provides a method of treating applied coatings having considerable resistance, so as to reduce the resistance thereof.

There are many uses for electrically conductive surfaces where it is difficult or undesirable to employ common sheet metal or foil. Heretofore, a number of methods have been suggested by which electrically conductive coatings may be formed on object surfaces. Electrical or chemical deposition has been suggested, but for many uses such deposition is impractical. The spraying of molten metal by the Schoop process has been suggested. With this process, however, it is often found difficulty if not impossible to produce a firmly adherent coating, and the coating often lacks adaquate continuity.

Finely-divided metal in a varnish has also been suggested. In the case of silver, coatings of good conductivity have been obtained in this manner. Silver is expensive, however, and therefore the use of a cheaper base metal is desirable. However, in the case of many other metals, such as copper in flake form (bronzing powder), it is found that coatings formed by these materials in a varnish are of very high resistance, rendering them unsuitable for many uses. Other suggestions have been made in which the conductive material is burned into the base. Silver is usually employed, and of course is expensive. Also, many base materials will not withstand the necessary high temperatures.

It is a broad object of the present invention to provide a method of producing an electrically conductive coating which is convenient and relatively inexpensive, and is adaptable to a wide variety of uses, particularly where a coating of low resistance is desired. Further, and more specific, objects will be apparent from the description of the invention given hereinafter.

In accordance with the present invention, a coating composition is prepared containing finely-divided particles of electrically conductive material, for example, flake metal particles, in a suitable bonding medium or vehicle. A coating of this composition is applied to the desired object surface in any suitable manner, as by spraying, etc. The applied coating is then activated in accordance with the invention so as to reduce the resistance thereof. The coating initially may be of relatively high resistance, and a resultant coating of much lower resistance obtained by the activation.

Activation of the applied coating is preferably carried out by direct electrical treatment. High-voltage, high-frequency potentials are advantageously employed, but common direct or alternating current low-voltage potentials may be employed if desired. Such activation has been found especially useful since it can be employed with a wide variety of coating compositions. In some cases, however, activation by heating to a sufficient temperature and for a sufficient period has been employed with success.

The particular activation treatment selected will depend on the particular results desired, the character of the coating composition, and the conditions surrounding the use of the process. High-frequency high-voltage discharge activation has been found particularly advantageous since a low resistance coating may be obtained without substantial heating of the coating or the object surface, and only a relatively short period of activation is required.

The invention is particularly useful where it is desired to have a coating of low resistance. However, by selecting different conductive materials and different bonding vehicles, and by using different types of activation treatments and varying the amount of activation, a wide range of coatings having a wide range of resistance values may be obtained. Therefore coatings produced in accordance with the invention are generally useful in the electrical field for a wide variety of purposes. However, several specific embodiments utilizing the process of the invention will be described hereinafter. These embodiments include the panel heating of rooms and chambers, the production of high-voltage electric condensers, and the shielding of radio tubes. In each of these embodiments certain important advantages result from the use of the general process of the invention which are peculiar to that embodiment.

In general, it may be stated that the coating composition is made with suitably finely divided particles of an electrically conductive material dispersed in a bonding vehicle capable of being reduced to and applied in liquid form (for example, by solvents or by heat) and capable of being acted upon after application by electrical current or by heat to form with the particles a coating of substantially reduced resistance. The conductive particles and bonding vehicle should preferably be selected in view of the activation treatment employed so that the resultant coating is substantially free from non-conductive areas and is of the proper resistance for the particular purpose contemplated.

Generally the particles should be fine enough to be easily sprayable and to afford uniformly good coverage, but should not be so fine as to offer too high a resistance due to an abnormally increased number of contacts from particle surface to particle surface which a passing current must negotiate. There appears to be resistance to flow of current from each particle to the next particle due not only to the non-conductive vehicle but also to a great extent to the condition of the particle surface itself, such as oxide films or adsorbed gases, etc. Electrical activation appears to have a tendency to burn and destroy the coating when excessively fine metal particles are employed.

Although the coating after activation may usually be used as a conductive element without further treatment, it will be understood that further treatment may be employed if desired. Thus the activated coating may be used as a base for electrolytic deposition, in which case the ease of applying the coating and the improved conductivity resulting from the activation treatment may facilitate the electrolytic treatment. Since the conductive coating may be readily applied to a wide variety of materials, it may be used as a base for decorative electroplating on materials such as non-conductive plastics, wood, etc. It may also be applied as a camouflage design on glass show-cases, etc., to set off burglar alarms in case the glass is broken.

The invention may be more readily understood by consideration of the following detailed description, taken in conjunction with the accompanying drawing in which:

Fig. 1 is a perspective view of an object surface provided with a conductive coating in accordance with the invention;

Fig. 2 is a cross section of the coated object of Fig. 1;

Fig. 3 is a perspective view of a chamber provided with conductive coatings for panel heating;

Fig. 4 is a diagrammatic cross section of a condenser formed of sheets of dielectric provided with conductive coatings in accordance with the invention; and Fig. 5 is an embodiment of a radio tube shielded in accordance with the invention.

Referring to Figs. 1 and 2, the base 10 is provided with a conductive coating 11 in accordance with the invention. Base 10 may be the surface of any article which it is desired to coat. Since the invention is particularly directed to the provision of a conductive coating, the base 10 will ordinarily be non-conductive. By selecting the proper vehicle, the coating composition may be made to adhere to almost any type of object surface. For example, firmly adherent coatings may be produced on glass, mica, wood, ceramics, etc. If the heat activation treatment described hereinafter is to be employed, the base must of course be of material which will withstand the necessary heating.

The high-frequency high-voltage activation treatment will be described first. A coating composition is prepared containing finely-divided particles of an electrically conductive material dispersed in a binding vehicle. The coating composition is preferably liquid, so as to permit ready application, as by spraying, dipping, painting, etc.

The vehicle may be any suitable bonding vehicle. Nitro-cellulose lacquers, cellulose acetate, and similar bonding vehicles may be employed. For example, the lacquer sold under the tradename DuPont No. 1130 has been found suitable. Also the lacquer sold as DuPont No. 1907 has been employed with success. These are believed to be lacquers of the nitro-cellulose type. Synthetic resins, such as phthalic anhydride glycerol esters known as alkyd resins, or under the trade-name "Glyptal," etc., may be employed if desired. Suitable solvents may be employed to render them liquid. Resins known under the trade-name "Vinylite" may be employed. For example, such a resin used as a coating composition, containing vinyl chloride and vinyl acetate in a solvent, has been employed with success. Ordinary paint and varnish vehicles may be used with more or less success, as well as heat-resistant bituminous vehicles of the nature of fatty acid pitches, natural elastic bitumens, and the asphaltites (gilsonite, glance pitch and grahamite), rendered liquid by solvents thereof. Other suitable vehicles may be employed if desired, depending on the particular conditions surrounding the use of the coating.

Finely divided metals may be used for the particles of electrically conductive material. Copper flakes have been found advantageous since copper has relatively high conductivity and is relatively inexpensive, and is especially suitable where coatings of very low resistance are desired. Other metals in either flake or powder form, or both, may be employed if desired. For example, aluminum, a copper alloy sold under the trade-name "Tungum," nickel, a copper-nickel alloy, the copper-nickel alloy known under the trade-name "Monel" metal, stainless steel, or zinc may be employed with more or less success.

When applied to a base and air dried, these coatings commonly have very high resistances. Tests have given resistances of the order of megohms, across a 5-inch square. Nevertheless, the resistance may be reduced to a very low value by the activation treatment. The actual value of the final resistance after activation varies with the different metals. When dispersed in DuPont No. 1130 and with the high-frequency high-voltage discharge activation, resistances under 10 ohms across a 5-inch square have been obtained for all these metals, the resistance with aluminum (in flake form) being as low as approximately one ohm, and with copper approximately one-half ohm.

The coating composition is applied to the object surface and then activated. The activation is carried out by directly applying to the surface of the coating an electric current from a high-frequency high-voltage source. It is considered advantageous to allow the coating to dry completely before activation.

One edge of the applied coating is advantageously grounded, as by means of a grounded metal bar touching the edge, or it may be placed near enough to a grounded object to permit the high-frequency high-voltage current to leak away. Then the terminal of the high-frequency high-voltage source is passed over the coating in close proximity therewith so as to permit a discharge of current to the coating. It is found advantageous to move the terminal to and fro over the coating so as to cover substantially the entire area. The terminal may be maintained in light contact with the coating during the to and fro motion if desired. However, it has been found advantageous to maintain a slight spacing between terminal and coating. A more or less continual sparking is noticed during treatment. A thin piece of insulating material, for example, paper, placed over the coating between the terminal and coating has been found helpful in securing good conductivity without injury to the coating.

A marked decrease in resistance between opposite sides of the coating has been obtained by merely passing the high-frequency high-voltage terminal around the edges of the applied coating. However, much further decrease in resistance has then been obtained by passing the terminal over the central portion as well.

It will, of course, be understood that when the terminal of the high-frequency high-voltage generator is near to or touching the applied coating, particularly as the treatment proceeds, the actual voltage may be much lower than the maximum voltage which the generator is capable of producing, since the latter is usually based on the distance in air across which a spark may be produced.

*Specific example (1)*

The coating composition was prepared by mixing five pounds of copper flake powder No. 150 (all particles passing through a 150-mesh screen) and one gallon of DuPont No. 1130 (believed to be a cellulose ester lacquer) until air carried in with the powder had escaped and the powder had been thoroughly wetted. Care was taken not to whip in air by the mixing propeller, as this would tend to thicken the mixture and necessitate thinning to facilitate proper spraying of the mixture. If necessary for smooth spraying, a small amount of thinner could be added.

The coating composition was sprayed on one side of a sheet of glass over a square 5 inches on a side, and was allowed to dry for a few hours at room temperature. The resistance was measured across the width of the coating by clamping copper strips along the full length of opposite edges of the coating, and was found to be over a megohm (the maximum reading of the ohmmeter used).

The applied coating was then activated with the high-frequency high-voltage treatment. The particular generator used was one made by the Lepel High Frequency Laboratories, Inc., of New York city, and called "Model E-2." This generator employs an oscillator of the quenched gap type and has an output rated at a frequency of approximately 2500 kilocycles, a maximum voltage to produce a spark approximately one inch in length, and a maximum current of 100 milliamperes, with an input rated at 110 volts, 60 cycles and 0.35 ampere. The generator terminated in a brush composed of a dozen or so short strands of wire.

In activating, the coating was positioned with one edge touching a grounded metal bar. Then the brush of the generator was moved back and forth over the coating, endeavoring to treat all areas of the coating equally. The brush was held only a slight distance away from the coating, and sometimes touched the coating. A more or less continual, relatively slight sparking between brush and applied coating was noticed during treatment, but was not excessive since the brush was kept in contact with or very close to the surface. Care was taken not to burn the coating. The final resistance varied with the duration of the treatment, the resistance decreasing rapidly at first and then more slowly until a fairly constant value appeared to be reached. For a treatment of several minutes in the manner described in this specific example, a final resistance of approximately one-half ohm between opposite edges of the 5-inch square was obtained.

With more powerful high-frequency high-voltage equipment, and with refinement of the character and proportions of the coating composition and the thickness of the applied coating, even lower resistances may be expected for the same length of treatment, or the same resistance for a shorter treatment.

It should be understood that this particular high-frequency high-voltage generator is mentioned only by way of example, and that other suitable high-frequency high-voltage equipment may be employed if desired. Also, in commercial practice the apparatus may be designed and arranged in accordance with the particular conditions surrounding the use of the method so as to activate the applied coating in a manner suitable for commercial purposes.

A high-voltage generator of considerably lower frequency than the specific generator just described has also been found to give good results.

The electrical activation may also be carried out with either direct current or 60-cycle alternating current, and at low voltages, by directly applying the voltage to the coated surface. Two conductors, between which the low voltage is impressed, may be placed in contact with separated areas of the applied coating. In this manner the resistance of the coating may be markedly decreased. In order to make the entire area of the coating of relatively low resistance, one or both of the conductors may be moved over the surface of the coating.

Small balls of steel wool about one inch in diameter have been found suitable for activating plates about five inches square. Small flat terminals of copper or silver may be employed if desired. The conductors are connected to the power mains, preferably through a current limiting resistance. A voltmeter may be connected across the resistance to give an indication of the progress of the activation, or electric lamps may be employed to limit the current and the glow of the lamps used to indicate the progress of the activation. The mains may be 110-volt, 60-cycle alternating current or direct current, or 220-volts or higher if desired.

One or both conductors may be moved over the coating to reduce the resistance thereof. One procedure found effective to reduce the resistance over the entire area of the coating is to hold a steel wool ball in each hand (the balls having a taped grip to provide insulation), and simultaneously move the balls to and fro over the entire area with a dabbing motion, maintaining an approximate spacing of one inch between the balls.

In one specific test, two steel wool terminals about one inch in diameter were connected to a 220-volt direct current source through two 40-watt, 110-volt lamps in series. The terminals were then moved back and forth over the coating, endeavoring to touch all parts of the coating, for a few minutes. At first little or no current flowed across the coating, as indicated by the lamps staying dark, and the terminals were brought fairly near to each other. At the finish, however, enough current flowed across a five inch square to light the lamps brightly, substantially no dimming by the coating resistance being noticed.

In another specific test, the steel wool balls were connected to a 110-volt, 60-cycle source through a 1500 ohm resistance. With the dabbing treatment just described, a low resistance was obtained after a short treatment.

Reduction of resistance can be obtained by moving the terminals over the surface of the coating, maintaining the terminals in contact with the coating and maintaining a small separation between the terminals. However, the dabbing motion appears to give a greater decrease in resistance for the same length of treatment, and a lower final resistance. This may be due to a discharge current flowing when the dabbing motion is employed, since the electric circuit is made and broken by the dabbing, thus interrupting the current, although no actual sparks may be observed with low voltage and current such as results from the use of the 110-volt, 60-cycle source and the 1500 ohm series resistance.

The actual resistance obtained depends upon a number of different factors. In general, a metal having good electrical conductivity, such as copper, is desirable when a low resistance is wanted. Also, in general, increasing the quantity of metal for a given quantity of vehicle and increasing the thickness of the applied coating may be expected to give a lower resistance in the final coating, at least within limits. If too little metal is employed, a lower conductivity is obtained, as is to be expected. If too much metal is employed, the composition will be difficult to apply and adhesion may be poor. For economy, it is of course, desirable to use the smallest quantity of the particular conductive material selected which will give the desired result with the particular activation treatment employed. After activation, the vehicle continues to bond the conductive coating to the underlying base.

Tests have also been made with 5 pounds of copper flakes No. 150 in a gallon of sodium silicate (waterglass). After air drying for an hour the resistance of this coating was several thousand ohms across a 5-inch square. After 24 hours air drying the resistance was over a megohm, the maximum reading of the ohmeter employed. Upon heating to temperature as high as 625° F., the resistance remained above this maximum reading. Nevertheless, with the high-frequency high-voltage treatment, the resistance was reduced to considerably less than a hundred ohms, although not as low as with the organic vehicles mentioned hereinbefore.

As before stated, activation by heat treatment may be employed with many applied coatings. This may be accomplished by baking the applied coating on the base in an oven for an appropriate length of time and to an appropriate temperature. If desired, heating can be obtained by the careful application of a direct flame, as from a blow-torch. In such case the coating should be heated gradually to avoid blistering, and the torching should not be continued to an extent such that the vehicle is completely destroyed. High-frequency induction heating could also be employed, if desired, with more or less success.

For the heat treatment, the base must, of course, be sufficiently heat-resistant. Also, the vehicle should be sufficiently heat-resistant to withstand the heat treatment and form a non-blistered bonding residue to retain the conductive particles in position on the base. Applying the coating composition relatively thinly and raising the temperature gradually has been found helpful in avoiding blistering.

The heat-resistant bituminous organic compounds mentioned hereinbefore have been found suitable for this purpose. Heat-resistant lacquers or varnishes may also be employed. Lacquers having alkyd resins, vinyl resins or urea formaldehyde condensation products as bases are examples of such lacquers. If copper flakes are employed, they appear to have a tendency to oxidize if heat is applied, especially when used in a cellulose ester vehicle. Therefore, if a low final resistance is desired, it is advantageous to employ vehicles which will have the effect of retarding oxidation and which appear to serve as active reducing agents at the baking temperatures employed, thus tending to reduce any oxide films which may be originally present on the particles or which may tend to be formed and offer electrical resistance. The heating may also be carried out in a reducing atmosphere. It is considered advantageous to use heat-resistant organic compounds, such as pitch, or heat-resistant synthetic resins such as the phthalic anhydride glycerol esters known as alkyd resins, glyptal, etc. Upon the application of heat, these vehicles are converted to residues which retain the conductive particles firmly bonded to the base.

The duration and temperature of the heat treatment should be selected in accordance with the particular vehicle employed, the particular conductive particles used, and the electrical conductivity desired in the coating. The necessary temperature and duration of heating may be readily determined for any particular coating composition by placing the coated base in an oven whose temperature can be regulated, and slowly increasing the temperature while at the same time measuring the resistance across the coating. This measurement can be readily made by affixing leads to opposite sides of the coating and bringing the leads outside the oven to a voltage source. By measuring current through the coating and voltages across it, the resistance can readily be ascertained. Or, an indication can be obtained by connecting the leads to the voltage source through a current limiting resistance of appropriate size, and placing a voltmeter across the resistance.

If this is done, experience has shown that at low temperatures no marked decrease in resistance is obtained in general, but as the temperature is increased a point is reached at which the resistance begins to decrease quite rapidly. Generally, temperatures above about 500° F. have been found desirable, although with certain combinations of metal particles and vehicle somewhat lower temperatures may be employed. For example, with copper flakes in Vinylite resin, appreciable conductivity begins to develop within the range 350–400° F. On the other hand, with aluminum flakes in a cotton-seed pitch vehicle, no appreciable conductivity has been developed even after heating as high as 900° F., possibly due to the highly inert and difficultly reducible aluminum oxide films on the multitude of aluminum flakes.

As an example of what may be obtained with the heat treatment, the following specific example will be given:

*Specific example (2)*

The vehicle is prepared by mixing 112 pounds of a hard, high-melting-point cottonseed-oil pitch with 15 gallons of orthodichlorobenzene and 75 gallons of coal tar naphtha. One gallon of this vehicle and 5 pounds of copper No. 150 are mixed and sprayed in a fairly thin coating on sheets of glass over an area 5 inches square. The coated plates are dried at room temperature and then placed in an oven. Upon slowly heating from room temperature to 350° F. in one hour, a coating was obtained having a resistance over a megohm (the maximum reading of the ohmmeter employed). Upon heating from room temperature to 500° F. in two hours, the average resistance between edges of the plates was 11,500 ohms, and upon heating from room temperature to 625° F. in three hours, the average resistance was reduced to less than an ohm.

At a temperature of about 500° F., the vehicle was converted to a bonding residue resistant to ordinary solvents of organic materials such as those mentioned as suitable for initially preparing the coating composition. At the temperature of 625° F. the residue still remained and tenaciously adhered to both the metal particles and the underlying surface, retaining the particles in position.

Copper flakes in Glyptal and a solvent, when applied and heated slowly to 625° F., has also given excellent conductivity. With copper flakes in either Glyptal or cottonseed-oil pitch, resistances of less than one-quarter ohm across a plate 5 inches square have been obtained. In both cases a residue remains which firmly adheres the coating to the base.

A still further reduced resistance has been obtained by carrying out the heat treatment in a reducing atmosphere instead of in air. As examples, coatings of copper in cotton-seed-oil pitch and copper in an alkyd resin, when raised from room temperature to 625° F. in two hours in a mildly reducing atmosphere of 93 per cent nitrogen and 7 per cent hydrogen, have given very low resistances.

In general, the bonding vehicle chosen should be such as will withstand the heat treatment necessary to produce the desired conductivity without being driven off or burned away and will retain its bonding ability despite that heat treatment.

As to the metals which may be employed with the heat treatment, copper flakes have been found particularly suitable, and firmly adhering coatings of excellent conductivity have been obtained. Among other metals which may be used with more or less success, if desired, are nickel and zinc. With these two metals, somewhat higher temperatures have been found desirable in order to obtain a low resistance. For example, in a vehicle of cottonseed-oil pitch, temperatures of about 700° F. or higher for nickel and about 800° F. or slightly higher for zinc, have been found advantageous.

The theory lying behind the various types of activation described herein has not been satisfactorily developed at the present time. It appears likely that both electrical and heat treatments act on the surface films, as well as on the bonding vehicle, by rupturing, heating or removal thereof, to thereby diminish the resistance, although this is not insisted upon. However, as described, with proper activation it has been found possible to greatly reduce the resistance of suitable coatings, even though the coating composition is made with a bonding vehicle of high electrical resistance and with metal flakes such as bronzing powders also offering resistance in the form of a multitude of contact resistances due to surface films of one kind or another, and even though the applied coating be of high resistance prior to activation. In general, it is found at the present time that the electrical activation treatments, particularly the high-frequency high-voltage discharge treatment, are more widely applicable to coatings of more widely different types than the heat treatment.

The foregoing description, taken in conjunction with Figs. 1 and 2, has described the applicant's process in its more general aspects, applicable for a wide variety of purposes. The invention will now be described with reference to particular embodiments wherein the novel manner of producing electrically conductive coatings has particular advantages.

Referring to Fig. 3, a chamber is shown having sides 12 formed of any suitable material. The chamber may be, for example, a room, a heating cabinet, etc., or, in fact, any chamber where it is desired to employ panel heating. The front of the chamber may be closed by a door (not shown), if desired. The inner surfaces of the chamber are provided with coatings 11 in the manner described in connection with Figs. 1 and 2. All the inner surfaces may be coated, or one or more selected surfaces. Suitable electrical connections (not shown) may be affixed to the surfaces and connected to a power source so as to cause current to flow along the surfaces and thus generate heat.

The resistance of the coatings should be selected in accordance with the area of the coatings, the voltage of the power source and the amount of heat desired, in accordance with considerations which will be apparent to those skilled in the art. In general, coatings of considerably higher resistance than those described in the specific examples given hereinbefore will be desirable, in order to prevent excessive current flow. The desired higher resistance may be obtained by an appropriate choice of materials and activation treatments, as will be clear from the foregoing detailed description. For example, the finely-divided conductive particles may be of material of fairly low specific conductivity; the proportion of finely-divided particles per gallon of vehicle may be decreased; the coating composition may be applied very thinly.

The particular activation treatment selected may be chosen in accordance with the coating composition selected so as not to give too low a resistance, and the activation may be carried out for only a short period of time. Also, in the case of activation by heat treatment, the temperature may be selected and correlated with the length of heating so as not to give too low a resistance.

It will be understood that the applicants' method of applying the coatings is particularly advantageous for this purpose, since the material can be readily applied by spraying, painting, etc. The activation can then be carried out to give the required conductivity.

Referring now to Fig. 4, a condenser is shown formed of plates of a dielectric 13, 13', 13'' provided with conductive coatings in accordance with the methods described in connection with Figs. 1 and 2. The applicants' methods are particularly advantageous in the production of condensers since they enable a condenser to be produced which will withstand high voltages and at the same time will not have excessive losses.

Condensers are often used in electric power distribution networks to correct power factor. Their use has usually been confined to lower voltage lines, for example, from 110 volts to 6900 volts, although occasionally they have been used at higher voltages. Impregnated paper dielectric condensers, withstanding 500 or 600 volts per unit, are usually connected in series to withstand the necessary voltage. Even so, such capacitors are usually not employed for voltages greater than 6900 volts.

The correction of power factor on the higher voltage distribution lines (for example, 13,200 volt lines), has been considered desirable since a condenser of given capacitance will correct the power factor of a larger load when connected to the higher voltage line than when connected to the lower voltage line. However, it has heretofore been found that the construction of condensers which will withstand the necessary high voltages has been too expensive to permit their wide use for power factor correction.

An important cause of breakdown of condensers at relatively high voltages is the presence of minute quantities of air between the conductive plates of the condenser and the dielectric. Even though a condenser is carefully evacuated and impregnated, minute quantities of air often remain and become ionized when a high voltage is impressed thereon. Such ionization causes local heating and eventually results in the breakdown of the dielectric at the point of local heating.

A similar effect sometimes occurs when a solid dielectric condenser is immersed in oil so as to reduce the tendency to set up corona or bushing at the edges of the metal plates. If oil gets between the dielectric and the plate, local heating and eventual breakdown therefrom may result, and in any event the breakdown voltage may be reduced due to the multiple layer dielectric effect.

By directly applying conductive coatings to the dielectric in accordance with the methods described hereinbefore, closely-adherent coatings may be produced which will exclude air, oil, etc., between the conductive coatings and the dielectric. By applying coatings to each side of the same sheet of dielectric, the presence of air and oil between plates of opposite polarity is avoided.

Although especially useful for correction of power factor on relatively high-voltage power lines, condensers made in accordance with the invention can be used for other purposes in the power field and also in the radio field.

In Fig. 4, a sheet of dielectric 13 is provided on each side with adherent conductive coatings 14 and 15. Dielectric plates 13' and 13" are similarly provided with conductive coatings 14', 15' and 14", 15". When assembled, coatings 15 and 14' are in contact, and coatings 15' and 14" are in contact. Leads are brought out from conductive coatings 14, 15' and 14" to lead 16, to form one terminal of the condenser. Similarly, leads are brought out from conductive coatings 15, 14' and 15" to lead 17, thereby forming the other terminal of the condenser. With this arrangement, when voltages are impressed on the condenser, they will be impressed between pairs of plates which are closely adherent to the same sheet of dielectric, thereby avoiding breakdown due to ionization. Air and oil may possibly penetrate between plates of each pair 15, 14' and 15', 14", but since each plate of a given pair is at substantially the same potential, there is no danger of breakdown between these pairs of plates.

The dielectric 13 may be selected in accordance with the usual considerations of power factor (energy loss), dielectric strength and dielectric constant, cost, etc. It should also be resistant to the particular medium in which it is to be submerged or encased, such at transformer oil, liquid or solid chlorinated diphenyls, waxes, etc., as the case may be. Mica is of course an excellent dielectric, but is expensive. Suitable glass having low losses may be employed. Also, dielectrics formed of phenol formaldehyde condensation products or other synthetic resins or plastics may be used, depending on service conditions. The hard rubber composition known as X–1–B (American Hard Rubber Co.) has been found suitable.

If the dielectric is to be subjected to activation by heat treatment, it must also be sufficiently heat-resistant to withstand the required heat. Usually hard rubber and many plastics will not be sufficiently heat-resistant. In such case, dielectrics such as low-loss glass or mica may be employed.

It should be clearly understood that the invention is not limited to the use of any particular dielectric, but that the dielectric may be selected in accordance with the usual considerations in the art, bearing in mind the heat-resistant requirement in the case of activation by heat treatment. It should also be understood that the mechanical assembly of the plates, the manner of making electrical contact therewith, and other details of construction may be in accordance with considerations which will be apparent to those skilled in the art.

The conductive plates 14, 15, etc., are produced in the manner generally described hereinbefore in connection with Figs. 1 and 2. However, in condensers it is particularly important to have low resistance coatings in order to minimize electrical losses and also to prevent an excessive rise in temperature of the capacitor. The latter consideration is important since the characteristics of dielectrics are often adversely affected at raised temperatures. Such low resistance coatings are made possible by the present invention by selecting suitable conductive particles, vehicles and activation treatments.

The coating described in Specific Example I, when applied to a suitable dielectric, has been found to give excellent results. Dielectric plates of X—1—B, coated on each side and activated in the manner there described, have been assembled in parallel in a suitable steel container and provided with suitable terminals to form a capacitor, as illustrated in Fig. 4. The number of plates assembled depends on the desired capacitance, as is well understood. The container was evacuated and transformer oil admitted while the container was under vacuum, so as to eliminate air from around the plates. Upon testing, the capacitors functioned satisfactorily for an extended period at 13,200 volts, 60 cycles, the full voltage being impressed between the two coatings on opposite sides of each sheet of dielectric. A voltage of 28,000 volts was impressed for a short interval and was withstood without breakdown.

It might be observed that capacitance is often obtained even with fairly high resistance coatings. Thus condensers formed by coatings 5 inches square on both sides of a dielectric have often been found to give substantially the same capacitance when the resistance between opposite sides of each coating was several thousand ohms as when it was less than one ohm. But the resistance is very important in securing low losses in the condenser and resultant low power factor, in preventing breakdown and in securing good terminal connections. With coatings made with copper flakes in DuPont No. 1130, for example, applied to sheets of X—1—B as dielectric and activated by the high-frequency high-voltage discharge procedure, condensers having a power factor of 0.42 per cent (substantially that of the dielectric alone) have been made.

If the condenser plates are activated by heat treatment, the heating should be carefully controlled so as not to blister the coatings, since blistering forms air pockets. The coating formed in the manner described in Example II has been employed successfully in capacitors. Capacitance measurements as well as resistance measurements were made on a sheet of dielectric coated on each side as described in Example II and heated to the temperatures there given. When heated to 350° F. in one hour, which gave a coating resistance of over a megohm, the capacitance was 54 micromicrofarads. After heating to 500° F. in two hours, which gave an average resistance of 11,500 ohms, the capacitance was 560 micro-microfarads. Upon heating to 625° F. in three hours, giving an average resistance of 1 ohm, the capacitance was 750 micro-microfarads, which was the capacitance to be expected with solid conductive plates.

Referring now to Fig. 5, an embodiment is shown in which conductive coatings formed in accordance with the methods of the invention are applied to the shielding of radio tubes.

For many applications, electronic tubes require shielding, especially when used in high-frequency circuits. This is particularly true in the case of radio tubes used, for example, in the radio and intermediate frequency circuits of a receiver.

For many years radio tubes were constructed almost entirely with glass envelopes. In recent years tubes with metal envelopes have been developed, and at the present time the two types are used more or less interchangeably. Each type possesses certain advantages over the other. The metal tube, by virtue of its metal shell, is fairly adequately shielded. Also, metal tubes are sometimes considered to have the advantage of smaller interelectrode capacitances. On the other hand, glass envelope tubes are usually easier to seal and evacuate. One reason for this is that elements within the tube can be effectively heated by induced currents so as to drive off adsorbed and absorbed gases. This cannot be done in metal tubes, so that reliance must be placed on the getter to maintain a high vacuum during use.

Glass tubes, particularly when used in radio frequency circuits, are often provided with external shields. Although the most common shield is a simple cylinder of metal, form-fitting shields are also employed. These form-fitting shields not only effectively shield the tube, but also have been found useful in decreasing interelectrode capacitance of electrodes within the tube. In such case, it is found that the spacing of the shield from the tube elements may be very important, and that a small increase in spacing may markedly change the interelectrode capacitance.

In accordance with the present invention, the conductive coating which serves as a shield may be applied directly to the glass envelope of the tube. In this manner, the tube can be effectively shielded, and the spacing of the shield with respect to the elements of the tube can be rendered uniform and permanent. Thus a glass tube can be produced which has the advantage of a metal tube in being self-shielded, and also possesses the other desirable attributes of the glass tube. Furthermore, by having the shield affixed directly to the tube, savings in set manufacture can be effected since additional shields and the cost of assembling them may largely be dispensed with.

As shown in Fig. 5, the conductive coating 11 is applied directly to the glass envelope 18 of the tube 19. The elements of the tube are omitted for the sake of simplicity of illustration. The conductive coating 11 may be formed by the methods described in connection with Figs. 1 and 2. To provide most effective shielding, the coating should be of low resistance. The manner in which low resistance coatings may be obtained will be clear from the description given hereinbefore.

The high-frequency high-voltage activation treatment is especially advantageous since the coating can be applied and activated after the tube is completely assembled, or can be applied to the envelope after the elements have been mounted therein and the tube evacuated, but before the base 20 is affixed. By applying the coating after sealing and evacuation, the elements can be inductively heated without interference. Of course, the coating could be applied at other points during the course of manufacture of the tube if desired.

As a specific example, a type 6SK7-GT tube was sprayed with the coating composition described in Specific Example 1. This type tube has a metal base grounded to one of the pins of the base. Therefore, the coating was sprayed to overlap the metal base, thus providing a convenient ground connection. When activated in the manner described in the specific example, a final resistance of less than an ohm from the top of the tube to the ground pin was obtained, the resistance in some cases being down to approximately one-half ohm.

Although activation by heating can be employed if desired, the required heat may in some cases injure the elements of the tube, or adversely affect the getter. If the base of the tube is of a composition which will not withstand the necessary heating, the coating may be applied prior to affixing the base to the envelope.

The shield may be grounded in any desired manner. For example, a ring may be placed around the base of the coating and connected to ground. Or, the coating may be connected to one of the pins of the tube which in turn may be grounded. If a metal base is used for the tube, the coating may be connected to the metal base which in turn may be grounded.

Although envelopes of glass have been specifically mentioned, it is clear that the shielding coating may be of use in case envelopes of other materials which are non-conductive, or insufficiently conductive, are employed. Furthermore, although radio tubes are particularly mentioned, the shielding can also be applied to other types of electronic tubes, if desired.

If desired, for any particular application of the conductive coatings of the invention, including the specific embodiments described hereinbefore, a plurality of superposed coatings may be applied to the base. Different coating compositions and different methods of activation may be employed for various ones of the plurality of coatings, if desired, or one or more coatings might be left unactivated.

It will be apparent from the foregoing that the present invention provides a new method of producing an electrically conductive coating. It will also be clear that the coatings are capable of many uses in the field of electricity. The specific embodiments described disclose applications wherein particular advantages result from the use of the novel method of producing the coatings. Many other uses will be obvious to those skilled in the art and need not be described here.

The methods of producing a condenser and of shielding radio tubes, and the respective products, are claimed specifically in copending applications Serial Nos. 334,463 and 334,464, respectively, filed concurrently herewith.

We claim:

The method of forming an electrically conductive coating on a base which comprises applying to the base a coating of a coating composition comprising finely-divided particles of an electrically conductive material and a bonding medium, the applied coating being of relatively high electrical resistance, impressing a voltage between two conductors, placing said conductors in close proximity to separated areas of said applied coating to cause current to flow and thereby substantially reduce the electrical resistance of the coating between said separated areas, and passing at least one of said conductors over the surface of the applied coating to reduce the electrical resistance of substantially the whole of said surface.

PRESTON DAVIE.
ARTHUR L. HALVORSEN.